Nov. 2, 1965 P. ABRAMSON 3,215,778

REMOTELY CONTROLLED PRINTING APPARATUS

Filed April 13, 1962 2 Sheets-Sheet 1

INVENTOR
PAUL ABRAMSON

BY Robert E. Sandt

AGENT

REMOTELY CONTROLLED PRINTING APPARATUS

Filed April 13, 1962

2 Sheets-Sheet 2

United States Patent Office 3,215,778

Patented Nov. 2, 1965

3,215,778

REMOTELY CONTROLLED PRINTING APPARATUS

Paul Abramson, Peekskill, N.Y., assignor to International Business Machines Corporation, New York, N.Y., a corporation of New York Filed Apr. 13, 1962, Ser. No. 187,299
8 Claims. (Cl. 178—23)

This invention relates to a data transmission system, and more particularly to apparatus for cyclically synchronizing an asynchronously operating data transmitter and data receiver to operate responsive to a timed signal produced by the data transmitter, and received and translated by the data receiver to produce at the receiver a printed or visual indication manifestive of the transmitted signal.

In data transmission devices of the prior art, as exemplified in the start-stop type of telegraphy, the synchronization of the transmitter and receiver was conventionally achieved by providing a single-revolution clutch at the receiver, which was engaged for each cycle of operation by a start, or synchronizing impulse, produced by the transmitter. Since the transmitter and receiver were both driven by carefully speed-regulated devices (usually controlled by tuning forks) the thus-phased devices were able to translate a serially transmitted data code into printed characters, or other sensible indicia, at the receiver. Because of the intermittent type of operation, these prior art telegraphic devices were necessarily limited in their speed of operation, as well as requiring carefully constructed mechanical elements to produce an apparatus capable of sustained dependable operation.

The instant invention obviates the foregoing difficulties by providing constantly moving elements both at the transmitter and the receiver to achieve an inexpensive and reliable data transmission apparatus. At a predetermined time in the cycle of the data receiver, a synchronizing impulse is generated by the receiver, transmitted over a communication link, to the data transmitter, where the impulse causes the transmitter to operate in phase with the receiver for the cycle of operation immediately to follow. The transmitter during each cycle of operation generates data pulses whose time spacing relative to the synchronizing impulse are determinative of the data to be transmitted. These data pulses are sent over the same communication link in a direction opposite to that in which the synchronizing impulse was first sent to cause the receiver to produce either visual or printed indicia manifestive of the data. It is thus that the instant invention provides a regenerative, or bi-directional, type of control, wherein the asynchronously moving transmitter and receiver are caused to be operated synchronously, and in phase, for each successive cycle of operation, by a control initiated by the receiver, so that data pulses returned by the transmitter will be in phase with the operation of the receiver, and susceptible to translation therein into either printed or visual manifestations of the data.

In one form of the invention the receiver employs an on-the-fly type of printer which generates the synchronizing impulse, and the transmitter sends back a single appropriately timed impulse definitive of the character to be printed. In another form of the invention the receiver includes a commutator which generates the synchronizing impulse, and the transmitter sends back one or more appropriately timed pulses which are distributed by the commutator to respective work circuits to manifest the data. In both forms of the invention the receiving devices are driven by synchronous motors, as is the data transmitter, which includes a movable eraseable storage member upon which a mark is recorded each cycle by the synchronizing impulse. This recorded mark is then moved past a succession of transducers whose physical spacing corresponds with the spacing of either the individual type or commutator segments in the receiver, so that any one or more of the transducers, when they are connected to the communication link by appropriate switched connections, will produce control signals in phase with the printer or commutator in the receiver to print or indicate the desired data.

Accordingly, it is an object of this invention to produce a data transmission system wherein the data receiver produces a synchronizing control pulse for each cycle of operation, which pulse causes the data transmitter to operate synchrononously, and in phase with the data receiver for each cycle, and the data transmitter returns control pulses whose time spacing delineates the data to be transmitted for translation and manifestation of the data at the receiver.

It is a further object of this invention to produce a data transmission system as defined in the foregoing object wherein the data transmitter includes a moving eraseable storage member and means responsive to the transmitted synchronizing impulse for recording thereon a sensible mark, which mark is passed by the movement of the member past a succession of transducers which are selectively connectable to a communication link with the receiver to generate data pulses whose timing with respect to the synchronizing impulse delineates the data to be transmitted.

Another object of this invention is to produce a data transmission system wherein a printer, cyclically driven at uniform velocity produces a synchronizing signal at a predetermined time in its cycle, which signal, when transmitted to a remote transmitter records a mark on an eraseable storage medium, cyclically driven at uniform velocity, which mark by virtue of the movement of the medium passes a succession of transducers, the disposition of which is such that the recorded mark passes each transducer in timed sequence with the passage of the successive type characters in the printer, whereby when one of the transducers is connected to transmit a character control pulse to the receiver, the printer will be operated to record an image of the associated type.

Yet another object of this invention is to produce a data transmission system wherein a commutator, cyclically driven at uniform velocity produces a synchronizing signal at a predetermined time in its cycle, which signal, when transmitted to a remote data transmitter records a mark on an eraseable storage medium, cyclically driven at a uniform velocity, which mark, by virtue of the movement of the medium passes a succession of transducers, the disposition of which is such that the recorded mark passes each transducer in timed sequence with the passage of the commutator over its respective segments, whereby when selected ones of the transducers are connected to transmit data, the commutator will distribute the time divided data pulses to respective indicating and work circuits.

The foregoing and other objects, features and advantages of the invention will be apparent from the following more particular description of preferred embodiments of the invention, as illustrated in the accompanying drawings.

Figures 1, 2:
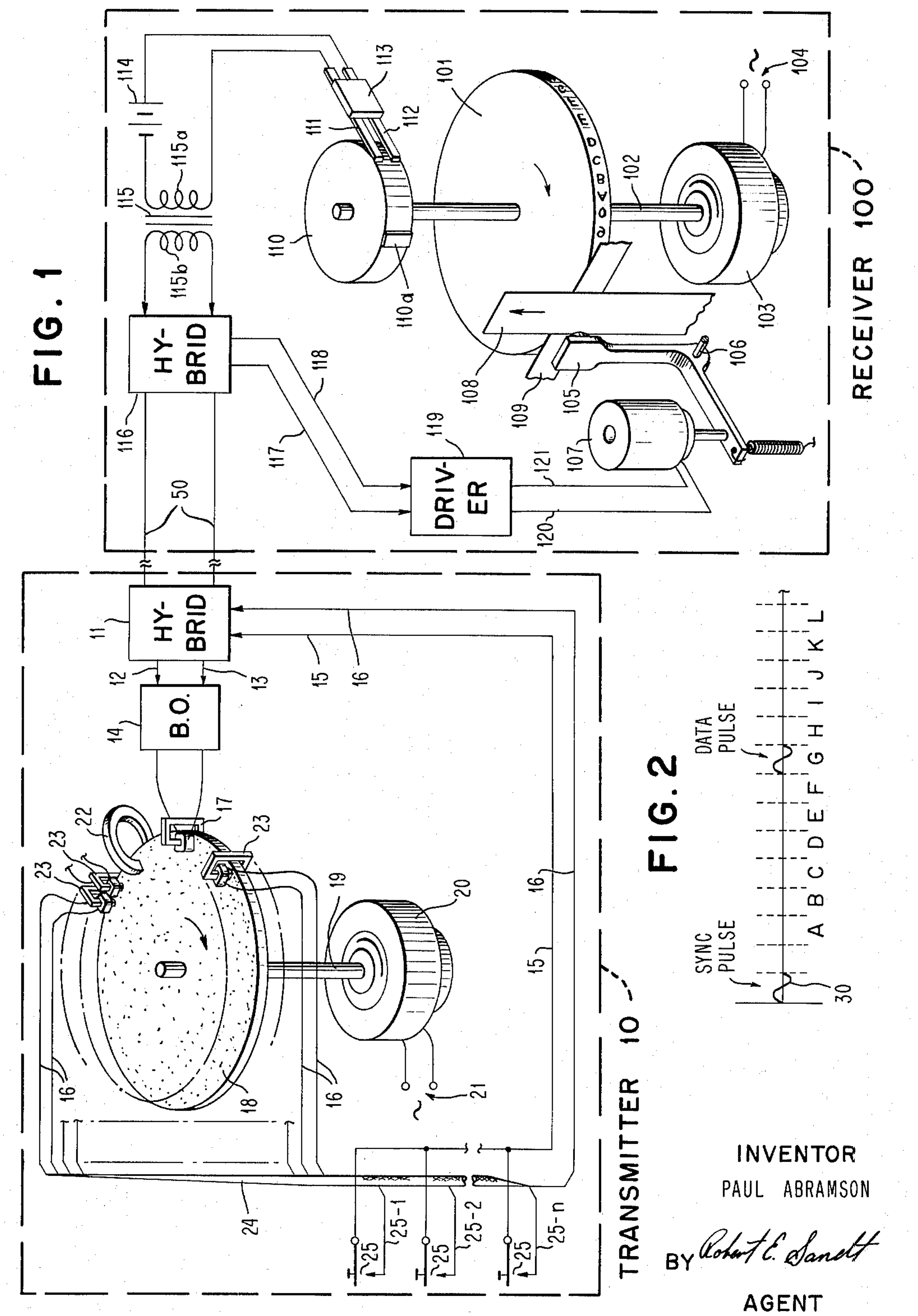
FIG. 1 shows a first form of the invention, wherein the receiver includes a printer.
FIG. 2 is a timing diagram of the operation of the apparatus in FIG. 1.
Figures 3, 4:
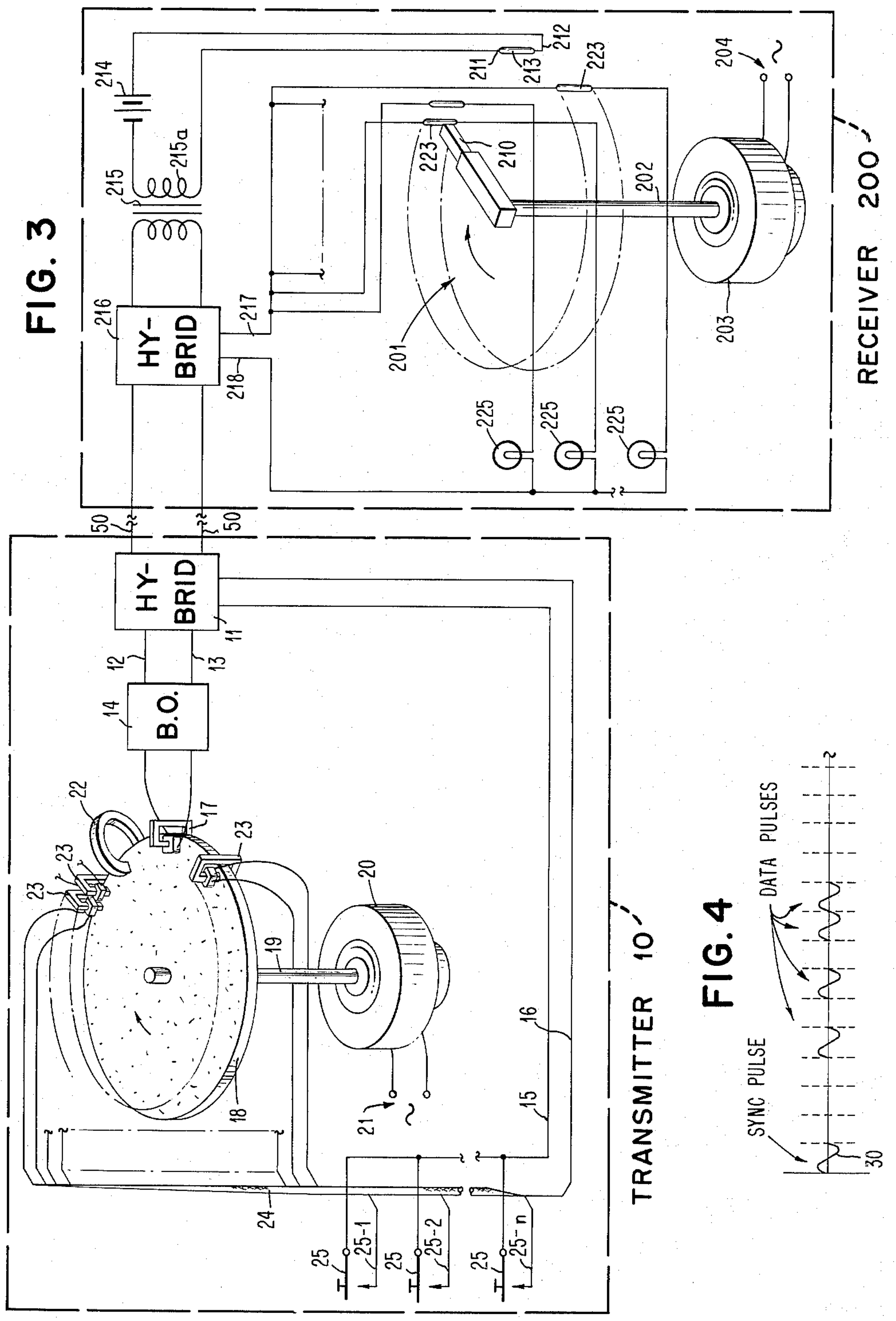
FIG. 3 shows a second form of the invention wherein the receiver includes an indicator for indicating a plurality of conditions.
FIG. 4 is a timing diagram of the operation of the apparatus in FIG. 3.

In both of the embodiments of the invention illustrated in FIGS. 1 and 3, the transmitter is shown to the left and enclosed in the dotted rectangle 10. Since the transmitter is common to both embodiments, it need only be described once, although its coaction with the respective receivers will be separately described.

The transmitter 10 (FIGS. 1 and 3) employs an erasable moving storage medium, preferably constructed of a magnetic material in the form of a disc 18, which is affixed to a shaft 19 driven by a synchronous motor 20, powered by a source of alternating current of controlled frequency, such as the conventional 110 volt 60 cycle commercial power supply, connected to the terminals 21. The disc 18 therefore rotates at a substantially constant speed. Disposed around and straddling the disc 18 are a series of magnetic transducers, there being one write, or recording head 17, and a succession of reading heads 23, one for each different item of data to be translated and utilized at the receiver. Both the write head 17 and the reading heads 23 are generally C-shaped with their opposed pole pieces defining an air gap through which the disc 18 rotates in close adjacency. Conventional windings are provided on the heads. The read heads 23 are spaced from one another and from the write head 17 in the same angular disposition as are the corresponding elements in the receivers, as will be explained. The coil of each read head 23 is provided with two leads, one of which is commoned with a corresponding lead from each of the coils of the other read heads by a line 16 in cable 24, the line 16 terminating in the hybrid circuits 11. The remaining leads from each of the coils of the read heads are individually and respectively connected via the cable 24 to a corresponding one blade 25–*l* to 25–*n* of switches 25, there being one switch for each read head. The remaining blades of the switches 25 are commoned and connected to the line 15 which terminates in the hybrid circuits 11 as a second input thereto. The switches 25 can be arranged in a convenient keyboard so as to permit data transmission under manual control. In such instance the keyboard would be provided with multiple key depression interlocks to prevent multiple key depressions during one cycle, if printing is to be effected, as well as key locking to hold a selected key depressed for the duration of any one cycle, and to prevent keying except at predetermined times in the cycle. It would also follow that automatic data entry can be achieved by providing closure of the switches under control of a computer, logging device, punched tape reader, or any group of machines whose operability status it is desired to monitor or indicate at a remote location. In all such instances the control of the interlocks would be phased by the recorded synchronizing signal rather than by any fixed relation to the position of the shaft 19.

Disposed between the last of the read heads 23 and the write head 17 in the direction of rotation of the disc 18 is an erase head 22 which is shown as a permanent magnet, although alternating current erasing could equally well be employed. It is to be noted that this erase head is disposed in an arcuate area which is void of any read heads, which void must be repeated in the moving elements of the receiver. This arcuate void can be advantageously employed to control the keyboard lock and interlock functions above described by providing an additional control head between the last of the read heads 23 and in advance of the erase magnet 22.

Assuming that the disc 18 is rotating and that synchronizing impulse produced at a remote receiver appears on the communication lines 50, then the hybrid circuits 11 will pass the impulse to the lines 12 and 13 to actuate the blocking oscillator 14, while suppressing the signal on the lines 15 and 16. The hybrid circuits 11 are well known in the communication art and need not be described. Suffice it to say that in this application, signals appearing on the communication line 50 will be passed to lines 12 and 13 and suppressed on lines 15 and 16, and that signals appearing on lines 15 and 16 will be passed to the communication line 50, but suppressed on the lines 12 and 13.

The operation of the blocking oscillator produces a current pulse of controlled amplitude and duration to energize the coil of the recording head 17 to record a vertically polarized magnetic spot on the disc 18. As this spot passes each successive reading head 23, it will induce a current flow in the coils thereof. If any one or more of the switches 25 is closed, the current pulses produced by the connected read heads will be applied as a succession of timed impulses to the communication line 50, the number of pulses and the timing thereof being controlled by the respective switch closure. Thus, for example, in FIG. 2, if the angular disposition of the read heads 23 is assumed to be uniform, then the synchronizing pulse will record a mark on the disc at a time 30 on the timing chart. This mark will pass each successive read head 23 at a time corresponding to the times labelled "A," "B," "C," etc., in FIG. 2, which times would correspond to the timing of pulses produced by appropriate closure of the switches 25 to transmit an A, B, or C. In the timing illustrated, it is assumed that a "G" is to be transmitted for printing purposes. Therefore, only one key will be closed during any one cycle, as the printer can only print one character per cycle. In FIG. 4 the synchronizing impulse is shown followed by a succession of data pulses, exemplifying the operation of the FIG. 3 apparatus. The receiver 100 in FIG. 1 is enclosed in the dotted rectangle and is connected with the transmitter by paired transmission lines 50, although a radio or wireless communication link can obviously be employed. As in the transmitter, the receiver employs a rotatable member driven by a synchronous motor. A print wheel 101, affixed to a shaft 102, and driven by a synchronous motor 103 powered from a source of regulated alternating current applied to the terminals 104 rotates at a speed substantially equal to the speed of the disc 18 in the transmitter, but not necessarily bearing any constant phase relationship thereto over prolonged operating periods. Therefore, a commutator 110 having a single conducting segment 110*a* disposed in the rim thereof, coacts with brushes 111 and 112, mounted in a brush block 113 to shunt the brushes to produce a synchronizing impulse on the lines 50 through battery 114, primary 115*a* of transformer 115, to produce a reaction in secondary 115*b* which is coupled to the lines 50 through the hybrid circuits 116. These hybrid circuits like those in the transmitter will pass the synchronizing signal to the transmission line but suppress it on the other lines 117 and 118. Conversely, signals originating at the transmitter and appearing on lines 50 will be passed to the lines 117 and 118 and suppressed in the transformer 115, although transmission thereto, in this instance, will produce no harmful effects.

So as to produce an on-the-fly impression of the type, a hammer mechanism including the solenoid 107, bellcrank 105, pivoted at 106, and ink ribbon 109 are shown schematically so as to illustrate a type of printer well known in the art. Whenever the solenoid 107 is operated, the bellcrank 105 is rocked clockwise to hammer the record tape 108 and ribbon 109 against the surface of the type wheel 101 to record an impression of that type character which at the instant of impact is beneath the hammer.

In a typical cycle of operation, as for example, the printing of a letter "G," the receiver will generate a synchronizing impulse when the commutator 110 bridges the contacts 111 and 112 to produce the synchronizing impulse, which through hybrid circuits 116, communication lines 50, hybrid circuits 11, blocking oscillator 14 and write head 17 causes a mark to be recorded on disc 18. At this instant no type character will be beneath the hammer 105. As the type wheel 101 and the recorded mark on disc 18 rotates synchronously, a succession of type will pass beneath the hammer 105 as the recorded mark passes the successive read heads 23. When the mark passes the "G" read head 23, the closure of the "G" switch in the bank of switches 25 will deliver a data pulse through the hybrid circuits 11, communication lines 50, hybrid circuits 116, lines 117 and 118, to driver circuits 119. These driver circuits amplify and shape the data pulse to power the solenoid 107 to effect printing of the letter "G" which is now beneath the hammer 105.

When the recorded mark on the disc 18 has traversed all of the read heads 23, the type on wheel 101 will have all passed the recording position in timed succession with the passage of the recorded mark. During the void time between the last read head and the write head, there will also be a corresponding void on the typewheel 101. During this time, the erase magnet 22 will erase the recorded synchronizing mark, and tape and ribbon feed operations in the printer will be effected. Although feeding mechanisms have not been shown, conventional ratchet feeds and auxiliary contacts on commutator 110 would effect this operation.

In the second form illustrated in FIG. 3, the transmitter 10 is unchanged, except that more than one item of data may be transmitted during a single cycle of operation. The receiver 200, enclosed in the dotted rectangle to the right, is connected as hereinabove by means of the communication lines 50 to the transmitter 10. Hybrid circuits 216, transformer 215 and battery 214 are again provided. Instead of a print wheel a commutator 201 is provided, which commutator is fixed to a shaft 202, driven by a synchronous motor 203 powered at terminals 204 by commercial 60 cycle alternating current. The commutator 201 may have any form, as for example, a rotating brush coacting successively with a plurality of fixed segments. Preferably, however, the commutator is constructed of a succession of angularly spaced magnetically actuated contacts enclosed in sealed non-magnetic ampules, such as glass. A rotating permanent magnet 210, secured to shaft 202, passes each of the enclosed contacts including the contacts 213 and the series of contacts 223, and closes them in timed succession. The contacts 213 have terminals 211 and 212, which connect with the primary **215*a* of transformer 215 to provide the synchronizing impulse, as did the contacts 111 and 112 in the first embodiment. This synchronizing impulse causes a mark to be recorded on the disc 18 as before. Depending upon the closure of the switches 25, timed impulses will be transmitted back over the lines 50, to the hybrid circuits 216 and appear on the lines 217 and 218. The line 217 is connected in common to one terminal of each of the magnetic read switches 223. The remaining blade of each of the switches is individually connected to one terminal of each of a plurality of indicator lights 225. The remaining terminals of all of the indicator lights are commoned and connected to the line 218**.

Since the individual switches 213 and 223 are angularly disposed in the same relationship as are the respective corresponding transducers 17 and 23 in the transmitter 10, the recorded mark on the disc 18, phased by action of the synchronizing commutator switch 213, will pass each transducer 23 as the magnet 210 passes each switch 223. Thus, any return impulses, as determined by closure of switches 25 will be directed to corresponding signal light 225 by timed closure of the commutator switches 223. If the magnetic disc and the commutator are driven at a sufficient speed, the persistance of vision of the human eye, as well as the persistance of glow in an incandescent filament, will provide a continuous indication at the receiver of the status of the switches 25 at the transmitter. If, for example, the switches 25 were connected to production machines, a supervisor at the receiver could monitor the status of all machines. So also could the receiver operate as a remote paging device, as for example, a doctor's calling system in a hospital.

Instead of the commutator 201 at the receiver, it is equally possible to employ a common flashing light with a drum having angular and axially spaced apertures to direct the timed flashes of light to an appropriate windowed display device to operate as an annunciator. So also can the commutator device be employed to direct the timed return pulses to appropriate work circuits in a computer, particularly since the commutator originates the cycle of operation. Thus, in the last instance, two computers could be caused to operate synchronously by the regenerative control hereinabove described.

In the foregoing two embodiments of the invention, the synchronization of the asynchronously operating transmitter and receiver is achieved by employing a magnetic storage member as a commutator device. By recording a new commutating magnetic mark under control of the data receiver in each cycle of operation, the two devices are caused to operate in phase for each cycle, so that the timed pulses selected for data transmission to the receiver will be in time with the operation of the receiver. Through use of a magnetic disc constructed of rubber with suspended magnetic particles and the vertical recording illustrated, a peak-to-peak signal strength in the order of magnitude of 36 volts can be achieved. As a consequence, direct line transmission without amplification can be had. An extremely simple, reliable, and inexpensive communication system is, therefore, achieved.

While the invention has been particularly shown and described with reference to preferred embodiments thereof, it will be understood by those skilled in the art that various changes in form and details may be made therein without departing from the spirit and scope of the invention.

What is claimed is:

1. A data transmission system comprising
(a) a cyclically operable data receiver having a predetermined substantially constant cycle time,
(b) a cyclically operable data transmitter having a cycle time substantially equal to the cycle time of said data receiver,
(c) a communication link connecting said data receiver and said data transmitter,
(d) means in said data receiver for generating a synchronizing signal at a fixed predetermined time in every cycle of operation of said receiver, and for impressing said signal on said communication link,
(e) means in said data transmitter, operative responsive to said synchronizing signal, for registering a manifestation of said synchronizing signal, and for circulating said manifestation at the cycle rate of said transmitter,
(f) a plurality of individually settable data controlling means in said transmitter, each operable, when actively set, to react to said circulating manifestation at predetermined time intervals following the registration of said manifestation to produce a return signal in said communication link,
(g) and means in said data receiver for producing a different datum manifestation during each one of a plurality of different time intervals following the generation in said receiver of said synchronizing signal, and operative responsive to each of said return signals to register a different datum, each of the said predetermined time intervals in said transmitter being correspondingly and respectively equal to the predetermined time intervals in said receiver.

2. The data transmission system of claim 1 wherein said means in said data receiver for producing a different datum manifestation during each one of a plurality of predetermined different time intervals comprises
(a) a printer having a type font movable with substantially constant velocity past a printing position,
(b) and a print impression taking member operable responsive to said return signal to record an impression of the type at said printing station when said return signal is received at said printer.

3. The data transmission system of claim 1 wherein the means in said data receiver for producing a different datum manifestation during each one of a plurality of predetermined different time intervals comprises (a) a commutator having a plurality of individual output circuit closing devices operative at said predetermined time intervals to distribute the return signal in said communication link to a corresponding one of said output circuit closing devices.

4. The data transmission system of claim 1 wherein the means in said data transmitter operative responsive to said synchronizing signal for registering a manifestation of said synchronizing signal and for circulating said manifestation comprises (a) a magnetic storage member rotating at a constant velocity and a recording transducer operable in response to said synchronizing signal to record on said member a magnetic mark and said plurality of individually actuatable data controlling means comprises (b) a plurality of reading transducers selectively switch connectable to said communication link to manifest the respective data to be transmitted, and so spaced along the path of movement of said member that the recorded synchronizing mark will traverse the respective reading transducers at said predetermined time intervals following the registration of said synchronizing magnetic mark on said disc.

5. A data transmission system having a remotely disposed data receiver and data transmitter connected by a communication link comprising (a) a data receiver having a cyclically operable printing device operable when activated to print a different datum character at each of a plurality of different predetermined times in the cycle thereof (b) means associated with said printing device for producing on said communication link a synchronizing signal at a fixed predetermined time in every cycle thereof (c) a magnetizable storage medium in said data transmitter, moving at a constant speed, and having a recording transducer operable in responsive to said synchronizing signals to record a magnetic mark on said medium, a plurality of individual reading transducers so spaced along the path of movement of said medium as to coact with said magnetic mark to produce a succession of data signals coincidently timed with the plurality of different predetermined times when said printing device is operative to print the respective characters (b) settable means for selectively connecting said reading transducers to said communication link to control the transmission of desired ones of said data signals on said communication link (e) and means in said receiver, operative responsive to said data signals for activating said printing device to record a datum character for each differently timed datum signal.

6. A data transmission system having a remotely disposed data receiver and data transmitter connected by a communication link comprising (a) a data receiver having a cyclically operable commutator with N output circuits and a common input circuit, and operative to connect said input circuit seriately to each of said output circuits at fixed predetermined times in the cycle of operation of said commutator, (b) means associated with said commutator for producing on said communication link a synchronizing signal at a fixed predetermined time in each cycle of said commutator.

(c) a moving magnetic surface storage medium moving at a substantially constant velocity in said data transmitter, (d) a magnetic recording transducer connected to said communication link and coactively coupled with said medium and operative responsive to said synchronizing signal to record a magnetic mark on said medium.

(e) N magnetic reproducing transducers coactively coupled with said magnetic storage medium and so spaced with respect to said recording transducers that the recorded synchronizing mark will traverse the reproducing heads corresponding to the seriate connection of said input circuit to said N output circuits in said commutator, (f) and means for selectively connecting said reproducing transducers to said communication link for providing return data signals for distribution by said commutator to corresponding ones of said output circuits.

7. A printer connected with and controlled by a remotely disposed data transmitter comprising (a) a print wheel rotated by a synchronous motor powered from a source of commerical regulated alternating current, the said print wheel having a font of data characters regularly spaced on the periphery of said wheel, (b) a hammer coacting with said print wheel for recording an image of the type opposite the hammer at the instant of operation thereof, (c) circuit closing means associated with said type wheel and operable to provide a synchronizing signal at a given position in the rotation of said type wheel, (d) a communication line, (e) means coupling said circuit closing means and said communication line to impress said synchronizing signal upon said communication line, (f) a magnetic recording transducer at said transmitter, connected to said communication link, and operative responsive to said synchronizing signal to produce a magnetizing flux in said transducer, (g) a moving magnetic storage medium coacting with said recording transducer such that said transducer produces a magnetic mark on said medium, the said medium being connected to and driven by a synchronous motor powered from a source of commerical regulated alternating current, (h) a plurality of magnetic reproducing heads coacting with and so spaced along the path of movement of said magnetic storage medium that said recorded magnetic mark successively traverses a different reproducing head in phase with the passage of successively different type past said hammer, (i) a switch, selectiveljy operable to connect each respective reproducing head to said communication line, to provide a return data signal to said receiver, (j) and means in said receiver, operative responsive to said return signal, to cause said hammer to record an image of the type on said type wheel then opposite said hammer.

8. A data transmission system comprising (a) a data receiver including a commutator, rotated at substantially constant speed by a synchronous motor powered from a source of commercial regulated alternating current, and having synchronizing contacts and work circuit contacts sequentially closed at fixed angular rotational positions of the commutator, (b) a single channel communication line connected to said receiver, (c) means in said receiver operative responsive to the closure of said synchronizing contacts for impressing a synchronizing signal on said communication line, (d) an eraseable moving magnetic storage medium in said transmitter rotated at substantially constant speed by a synchronous motor powered from a source of commercial regulated alternating current, and including a magentic recording transducer in coaction with medium, connected to said communication link, and operative responsive to said synchronizing signal to produce a magnetic mark in said medium, together with a plurality of reproducing transducers in coaction with said medium and angularly spaced along the path of rotation of said medium such that said recorded mark will seriately coact with each successive reproducing transducer at the same time said communtator is closing the corresponding work circuits, (e) a switch associated with each said reproducing transducer for selectively connecting the transducers to said communication link to provide by their closure a sequence of return signals on said line manifestive of the data to be transmitted, (f) means in said receiver for directing the return signals to said commutator for timed distribution thereby to said work circuits, (g) and means in coaction with said magnetic storage medium disposed ahead of said recording transducer for erasing said magnetic mark.

References Cited by the Examiner

UNITED STATES PATENTS

| | | | |
|---|---|---|---|
| 2,206,665 | 7/40 | Doty | 178—23.1 |
| 2,903,514 | 9/59 | Van Duuren | 178—23.1 |

NEIL C. READ, *Primary Examiner.*

MALCOLM MORRISON, *Examiner.*